C. E. AKELEY.
ATTACHMENT FOR MOTION PICTURE CAMERAS.
APPLICATION FILED OCT. 31, 1918.
1,314,493.
Patented Sept. 2, 1919.
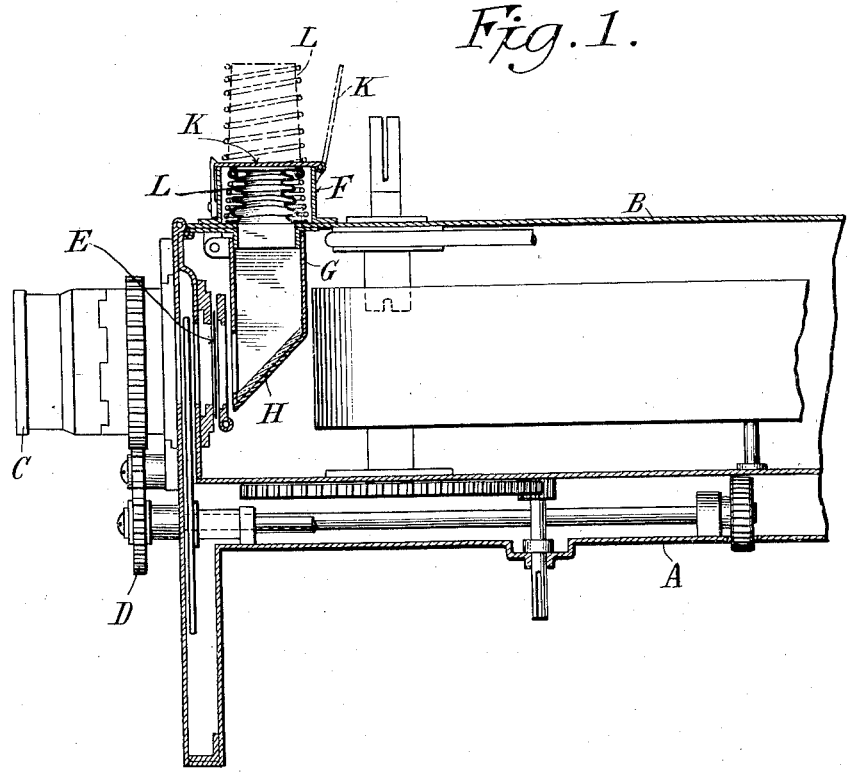
Fig. 1.
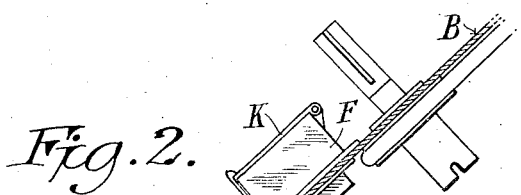
Fig. 2.
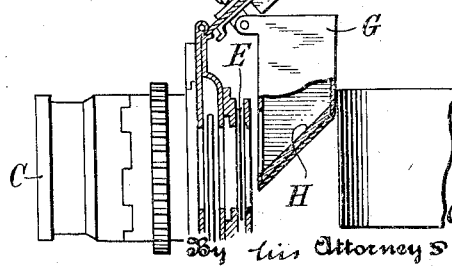
Inventor
Carl E. Akeley
By his Attorneys
Kerr, Page, Cooper & Hayward

UNITED STATES PATENT OFFICE.

CARL E. AKELEY, OF NEW YORK, N. Y., ASSIGNOR TO AKELEY CAMERA INC., OF NEW YORK, N. Y., A CORPORATION.

ATTACHMENT FOR MOTION-PICTURE CAMERAS.

1,314,493.  Specification of Letters Patent.  Patented Sept. 2, 1919.

Original application filed April 12, 1918, Serial No. 228,093. Divided and this application filed October 31, 1918. Serial No. 260,439.

*To all whom it may concern:*

Be it known that I, CARL E. AKELEY, a citizen of the United States, residing at New York, county and State of New York, have invented certain new and useful Improvements in Attachments for Motion-Picture Cameras, of which the following is a full, clear, and exact description.

This application is a division of a prior application filed by me on April 12, 1918, Serial No. 228,093, and its subject is an attachment for motion picture cameras shown and described in my original case.

In practically all forms of motion picture cameras it is desirable, if not frequently necessary, to observe or test the accuracy of the focus secured by the adjustment of the objective lenses and this improvement resides in a means which I have devised for this purpose.

The invention is applicable to a great variety of cameras and the particular instrument to which it is herein shown as applied requires but little explanation. It need only be said that whenever the construction of the camera permits it, an opening is provided in the casing under which is supported a suitable frame or support for an inclined mirror that normally lies immediately back of the field of exposure of the film and reflects out through a hinged or detachable cover for the opening an image of the picture projected by the lenses onto the film.

The specific construction of the device will be more fully set forth hereinafter.

In the drawings hereto annexed Figure 1 is a sectional view of a portion of a camera with my improvement applied thereto and Fig. 2 is a similar view showing the parts in a different position.

A is the box or casing of a motion picture camera having a hinged side or cover B. The lenses are indicated by C and the gears for focusing the same by D.

The path of the film is indicated by the line E and any form of open film guide may be used. Alongside the lens tube is a cylinder or casing F to which or beneath which there is pivotally connected a three-sided tube or any other suitable form of frame G, carrying a mirror H inclined at an angle of 45 degrees and lying immediately back of that part of the film upon which the pictures are projected.

The casing F has a lid K which may be opened and closed and when opened the image of the picture on the translucent film is made visible to the eye of an operator. To assist the latter in examing the picture the casing contains an extensible tube L composed of a spiral spring covered with soft material which, when the lid is opened prolongs the passage through which the picture is seen.

In this particular form of camera, one side of the casing, A is hinged so as to be capable of being turned back and, in order that the mirror support may not interfere with this movement, it is hinged as shown.

When the lid K is closed all light is excluded from the camera, but for testing purposes the admission of light is of little moment.

What I claim is:—

1. The combination with a camera casing of a photographic objective adapted to direct the light rays upon a translucent film, means for focusing the objective, an inclined mirror back of the field of exposure of the film, the casing having an opening in its wall through which, when uncovered, the mirror is visible for the purpose of testing or observing the focus.

2. The combination with a camera casing of a photographic objective adapted to direct the light rays upon a translucent film, means for focusing the objective, an inclined mirror back of the field of exposure of the film, a small chamber on the wall of the casing having an opening therein a cover for said opening and an extensible tube contained in the chamber through which the focus may be observed or tested.

3. The combination with a camera casing having a hinged side of a photographic objective adapted to direct the light rays upon a translucent film, means for focusing the objective, the said hinged side having an opening through the same, a lid for closing the same, a frame pivoted beneath the opening and an inclined mirror carried thereby which lies immediately back of that part of the film upon which the pictures are projected.

In testimony whereof I hereunto affix my signature.

CARL E. AKELEY.